(12) United States Patent
Nakamura

(10) Patent No.: US 10,846,997 B2
(45) Date of Patent: Nov. 24, 2020

(54) SHOPPING PAYMENT SYSTEM

(71) Applicant: Kenta Nakamura, Osaka (JP)

(72) Inventor: Kenta Nakamura, Osaka (JP)

( * ) Notice: Subject to any disclaimer, the term of this patent is extended or adjusted under 35 U.S.C. 154(b) by 0 days.

(21) Appl. No.: 16/774,624

(22) Filed: Jan. 28, 2020

(65) Prior Publication Data
US 2020/0265690 A1 Aug. 20, 2020

(30) Foreign Application Priority Data

Feb. 15, 2019 (JP) .................................. 2019-025683

(51) Int. Cl.
*G07G 1/00* (2006.01)
*G06Q 30/06* (2012.01)

(52) U.S. Cl.
CPC ....... *G07G 1/0081* (2013.01); *G06Q 30/0633* (2013.01); *G06Q 30/0641* (2013.01)

(58) Field of Classification Search
CPC ............ G07G 1/0081; G06Q 30/0633; G06Q 30/0641
USPC ....................................................... 235/383
See application file for complete search history.

(56) References Cited

U.S. PATENT DOCUMENTS

| | | | | |
|---|---|---|---|---|
| 7,216,109 B1* | 5/2007 | Donner | .................. | G06Q 10/02 235/382 |
| 2008/0011836 A1* | 1/2008 | Adema | .................. | G06Q 10/00 235/383 |
| 2008/0021782 A1* | 1/2008 | Wieth | ................ | G06Q 30/0253 705/14.51 |
| 2012/0284132 A1* | 11/2012 | Kim | ........................ | G06Q 20/18 705/20 |
| 2013/0175338 A1* | 7/2013 | Block | ................... | G07F 19/205 235/379 |
| 2015/0294303 A1* | 10/2015 | Hanson | .............. | G06K 19/0723 235/379 |
| 2019/0147709 A1* | 5/2019 | Schoner | ............... | G07G 1/0045 235/383 |

FOREIGN PATENT DOCUMENTS

JP 2013-041465 A 2/2013

* cited by examiner

*Primary Examiner* — Michael G Lee
*Assistant Examiner* — David Tardif
(74) *Attorney, Agent, or Firm* — Leason Ellis LLP

(57) ABSTRACT

A shopping payment system for promptly settling a product price without bothering humans. The system comprising, a management server that assists customers to settle their merchandise purchases, a camera capable of communicating with the management server and capable of imaging a product that moves in and out of the shopping basket, and a customer terminal for accessing the management server. The management server links the customer terminal with the camera, which receives an instruction to start imaging and transmits imaging information of the product to the management server, which identifies the product type based on the imaging information. If identified normally, the management server notifies shopping product details to the customer terminal. If not identified normally, the management server notifies an abnormal state to the customer terminal. When the customer approves the shopping product details, the customer terminal notifies the approval to the management server to complete payment.

2 Claims, 16 Drawing Sheets

Credit card payment
Once approved, shopping details screen will be displayed

While putting smartphone close to camera, image product barcode by camera provided on store shelf, and put it in shopping bag.

If it is not appropriate, indicator flashes red, please reinsert goods.

Payment start

SHOPPING PAYMENT SYSTEM

This application claims the benefit of priority to Japanese Patent Application No. 2019-025683 filed on Feb. 15, 2019, the content of which is incorporated herein by reference.

BACKGROUND OF THE INVENTION

The present invention relates to a shopping payment system enables quick payment for a product (items) purchased at stores.

As a shopping payment support system after shopping at a store, there is a system that uses a POS terminal for the payment of a product that a customer has enter in a shopping basket (see, for example, Japanese Laid open Patent 2013-41465).

This POS terminal images the product entered in the shopping basket by the imaging unit, and receives the shopping basket ID together with the image, then recognizes the product entered in the shopping basket from the received captured image, after that, creates a list recorded the recognized product for each shopping basket.

SUMMARY OF THE INVENTION

However, such a system using a POS terminal, even if the product is not properly captured when the product is entered in the shopping basket and the product cannot be recognized, the POS terminal immediately not informs the customer about that. As a result, it is necessary to confirm the purchased product again at the time of final payment, which is troublesome. In addition, this system requires that shopping payment for the product is settled separately, and there is no prompt payment.

The present invention is to provide a shopping payment system, which can prevent from not being recognized the product entered in the shopping basket due to the inability to properly capture the image, thereby customers can pay for the product quickly without bothering humans.

The present invention is a shopping payment system for product purchased at stores comprising;

a management server that processes shopping payment for merchandise based on a shopping application that assists customers in the store to pay their merchandise purchases, a camera capable of communicating with the management server and capable of imaging product that are entered in and out of the shopping basket by customers, and a customer terminal of customer who downloaded the shopping application which can access the management server; wherein, the management server links the customer terminal with the camera, by access from the customer terminal that started the shopping application, the camera receives an instruction to start imaging by accessing the management server, and sends imaging information of product to be put in and out of the shopping basket to the management server, the management server identifies the product type based on the imaging information transmitted from the camera and the product database stored in advance, if it can be identified normally, notifies the product details as a normal state to the customer terminal, if it cannot be normally identified, notifies an abnormal state to the customer terminal, if the customer approves the shopping items displayed on the customer terminal, the customer terminal notifies the approval to the management server so that a payment is completed.

According to the present invention, if the product type cannot be normally identified based on the imaging information transmitted from the camera linked (associated) with the customer terminal, the customer is notified as an abnormal state, so the customer enters again the product in the shopping basket. Finally, merchandise price payment at the customer terminal can be quickly performed without bothering personnel.

DETAILED DESCRIPTION OF THE INVENTION

First Embodiment

Figure 1:
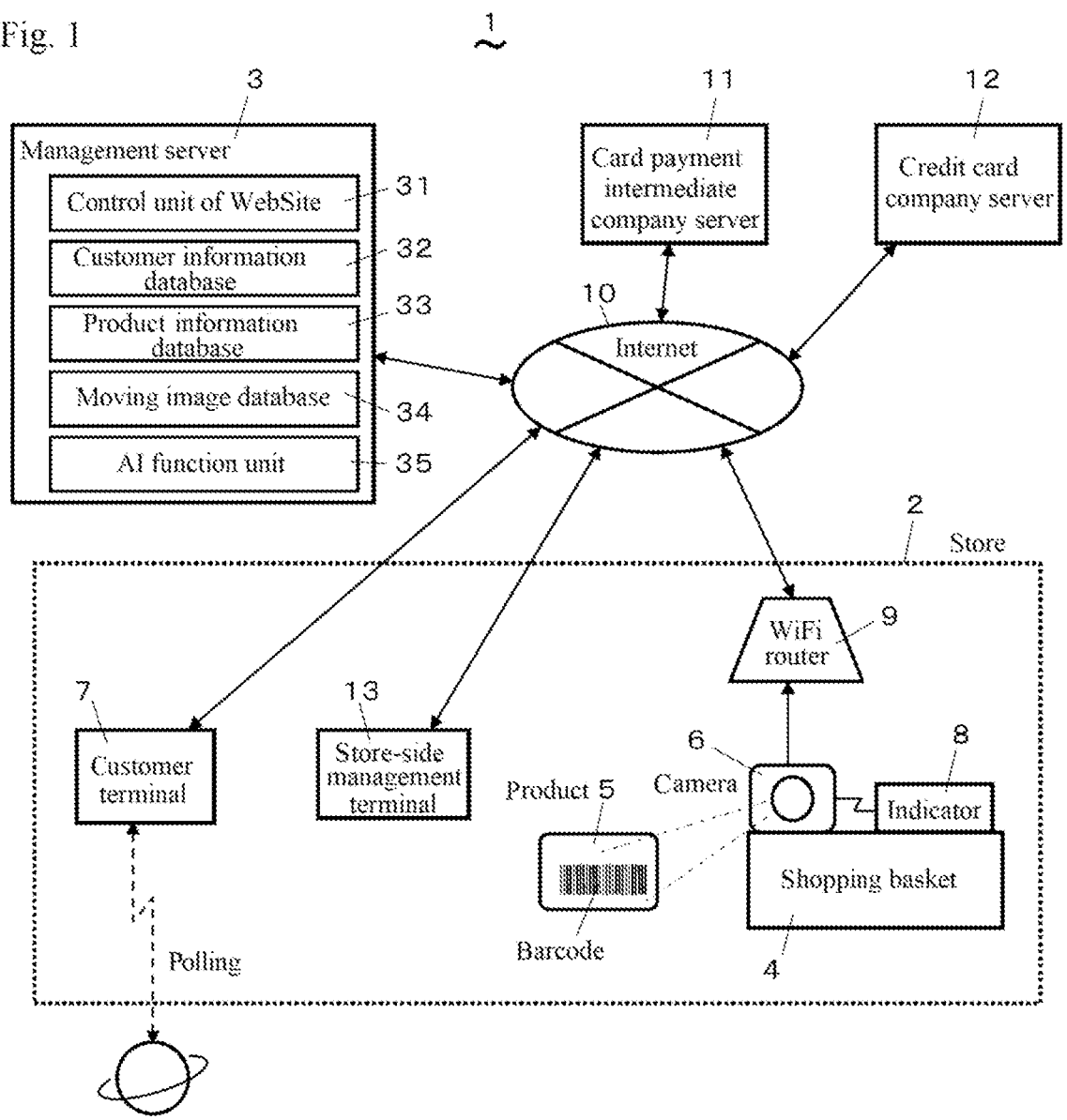
FIG. 1 is an overall configuration diagram showing a shopping payment system according to a first embodiment of the present invention.

Hereinafter, a shopping payment system according to a first embodiment of the present invention will be described with reference to the drawings. FIG. 1 shows the overall configuration of the shopping payment system 1 (hereinafter, referred to as the present system) according to this embodiment. The system 1 includes a management server 3 (hereinafter, referred to as a server) that processes the payment of the commodity fee based on a shopping application (hereinafter, referred to as a shopping app) that supports the payment of the commodity shopping by the customer at a store 2, a camera 6 that captures a commodity 5 brought in and out of the shopping basket 4 by the customer, and a customer terminal 7 of the customer who downloads the shopping app. The camera 6 is mounted on the shopping basket 4. The shopping basket 4 may be a shopping cart 4a and will be described below as a shopping basket 4. A shopping basket as claimed also includes a shopping cart. The camera 6 can communicate with the server 3 and the customer terminal 7 can access the server 3.

The server 3 links the customer terminal 7 with the camera 6 by access from the customer terminal 7 which has started the shopping app. The camera 6 receives an instruction to start imaging by accessing the server 3 through the WiFi router 9 and the network, for example, the Internet 10, and transmits imaging information of the product 5 to be put in and out of the shopping basket 4 to the server 3. The server 3 identifies the product type based on the imaging information transmitted from the camera 6 and the product database stored in advance, if it can be identified normally, notifies shopping product details to the customer terminal 7 as a normal state, and if it cannot identified normally, notifies an abnormal state to the customer terminal 7. If the customer approves the shopping product details displayed on the customer terminal 7, the customer terminal 7 notifies the approval to the server 3 so that a payment is completed.

It is desirable that the shopping basket 4 comprises an indicator 8 (shopping basket indicator) that lights in a plurality of lighting states depending on whether it is in a normal state or abnormal state. The indicator 8 is lighting controlled by an output signal from the camera 6. The link of the customer terminal 7 with the camera 6 is desirably made by that the customer terminal 7 receives an ID (number) preset in the camera 6 and transmits the ID to the server 3.

In an embodiment having the shopping basket indicator 8, the server 3, when the link is made, activates the corresponding camera 6, and lights on the shopping basket indicator 8 in a normal state. The server 3 identifies the product type based on the imaging information transmitted from the camera 6 and the product database stored in advance, if it cannot be identified normally, the server 3 light on the shopping basket indicator 8 via the camera 6 in an abnormal state. When the customer approves the shopping product details displayed on the customer terminal 7, the information is notified to the server 3, and the server 3 lights on the shopping basket indicator 8 to indicate the status of a payment completion.

The server 3 of the present embodiment includes a control unit 31 of the WebSite of the shopping app that processes the payment for product purchased at stores by the customer, a customer information database 32, a product information database 33, a moving image (imaging information) database 34 at the time of shopping by the customer, and an AI (artificial intelligence) function unit 35. The store 2 includes a WiFi router 9 for wireless-LAN connection between the server 3 and the camera 6 and other devices.

The customer terminal 7 is a smartphone or the like having the function of accessing the server 3 via the Internet 10, downloading shopping apps, and receiving signals from satellites for GPS to acquire location information. The server 3 requests the card payment processing to the card payment intermediate company server 11 and various credit company server 12 in response to an instruction from the customer terminal 7. The card payment intermediate company server 11 registers and manages the card information of the customer. The various credit card company server 12 is a server of a company which approves various card payments.

It is desirable that the system 1 further comprises a shop-side management terminal 13 possessed by a clerk on the shop side capable of receiving a command from the server 3. When the server 3 cannot be identified the product type and becomes an abnormal state, the server 3 notifies the store-side management terminal 13 to that effect.

In the customer information database 32 in the server 3, the information of the customer using the shopping app is registered in advance. In the product information database 33, the type of product, shapes, various information such as prices are registered in advance by learning. The moving image (imaging information) database 34 at the time of shopping by the customer stores the imaging information by the camera 6 when shopping of product by using the shopping app. AI function unit 35 analyzes the imaging information with reference to the product information database 33, to identify the product type.

The product 5, the type of product, barcodes such as prices are displayed. The camera 6 captures the product 5 when the product 5 are brought in and out of the shopping basket 4 by the customer, and at that time, it is advantageous if the barcode is read. However, even if the barcode cannot be read, the server 3 is likely to be able to accurately identify the product with the AI function section 35 as long as the imaging information is clear.

Figure 2:
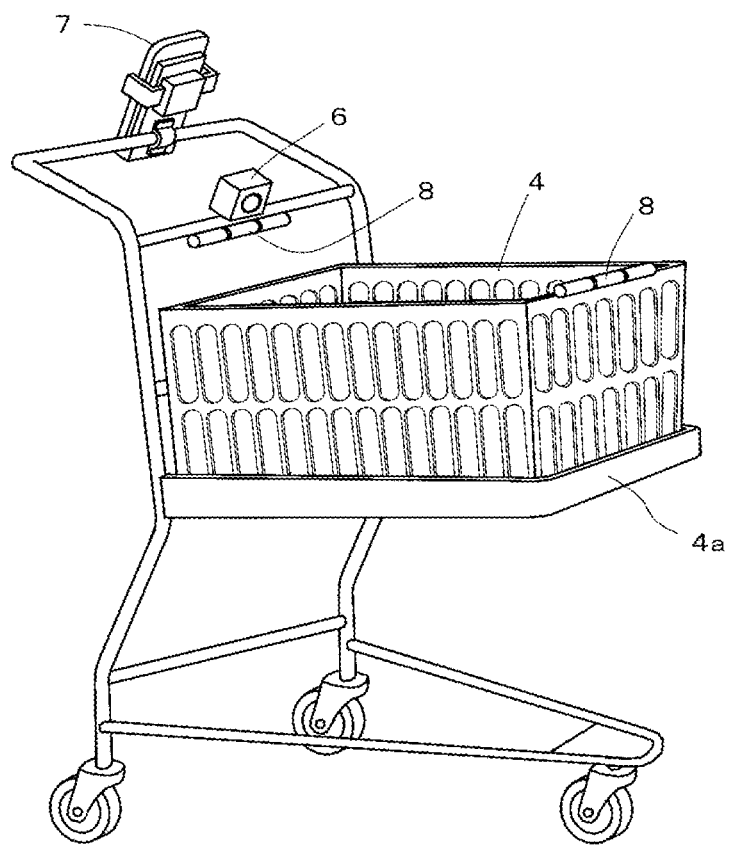
FIG. 2 is a perspective view of the shopping basket used for the system.

FIG. 2 shows a shopping basket 4 used in the system 1. The shopping basket 4 is equipped in a store, and in this instance, the shopping basket 4 is placed on a shopping cart 4a which is pushed and moved for shopping by customers. A rechargeable or battery powered camera 6 is fitted on the shopping basket 4 or shopping cart 4a, and also the customer terminal 7 is fitted on the same. The camera 6 receives radio waves from the WiFi router 9 and is connected WiFi to the server 3. The camera 6 stores a password number that enables connection with the WiFi router 9 and a program that automatically accesses the server 3 at all times, and receives instructions from the server 3 after WiFi connection. The camera 6 may be capable of communicating via a telephone line (shim card).

The shopping basket 4 or shopping cart 4a is provided with an indicator 8. The indicator 8, for example, using an LED light includes a plurality of colors such as yellow, red, and blue, is light on or blink in response to an instruction from the server 3 via the camera 6. In FIG. 2, two indicators 8 are provided on both the shopping basket 4 and the shopping cart 4a respectively, while it is sufficient to be provided on either one. In this embodiment, a shopping basket 4 is put on the shopping cart 4a, while the shopping cart 4a may be integrally provided with a shopping basket. The shopping basket 4 as claimed also includes such a configuration.

Figure 3:
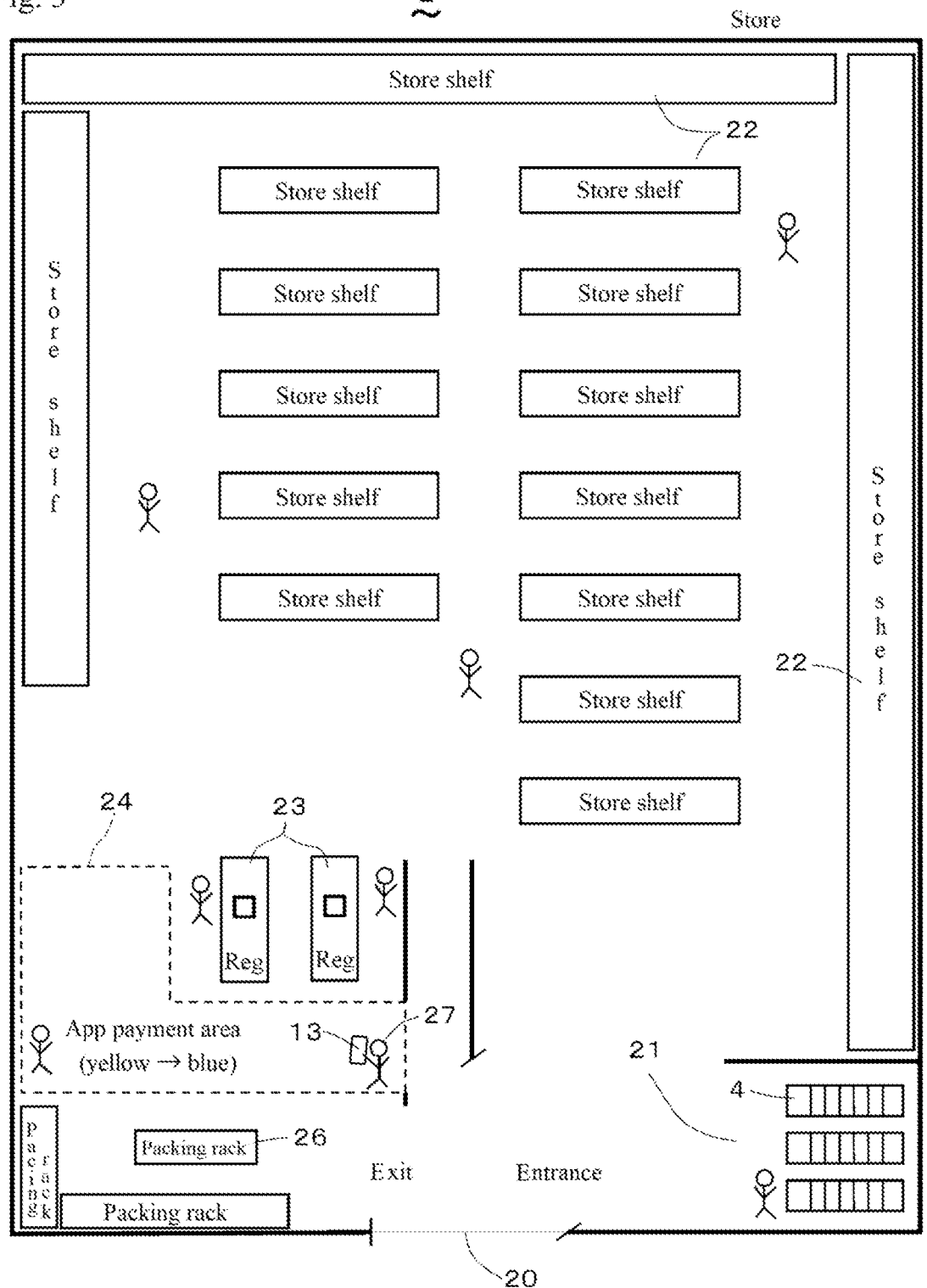
FIG. 3 is a plan view of the store where the system is used.

FIG. 3 shows a planar configuration of the store. The store 2 has a cart yard 21 near the entrance 20, a store shelf 22 in which product are placed, a checkout registers 23 which settles the shopping of general customers before the exit, an app payment area 24 close thereto, and a packing rack 26 near the exit. In the store, some clerk 27 having the store-side management terminal 13 are arranged appropriately. In the cart yard 21, the shopping customer (hereinafter, referred to as the customer) sets the customer terminal 7 on the shopping cart 4a. The indicator 8 of the shopping cart 4a changes display depending on whether or not the shopping is properly performed during shopping based on the imaging information by the camera 6, and also changes display when the payment is made in the app payment area 24 (described in detail later). The customer who has properly settled using this shopping app are no longer need to pass through the checkout register 23 for money payments for ordinary customer. Then, the customer shall replace the shopping product from the shopping cart 4a into a bag or the like for return at the packing rack 26. This completes the shopping. Therefore, any waiting time for the checkout register may be omitted for the customer.

Figure 4:
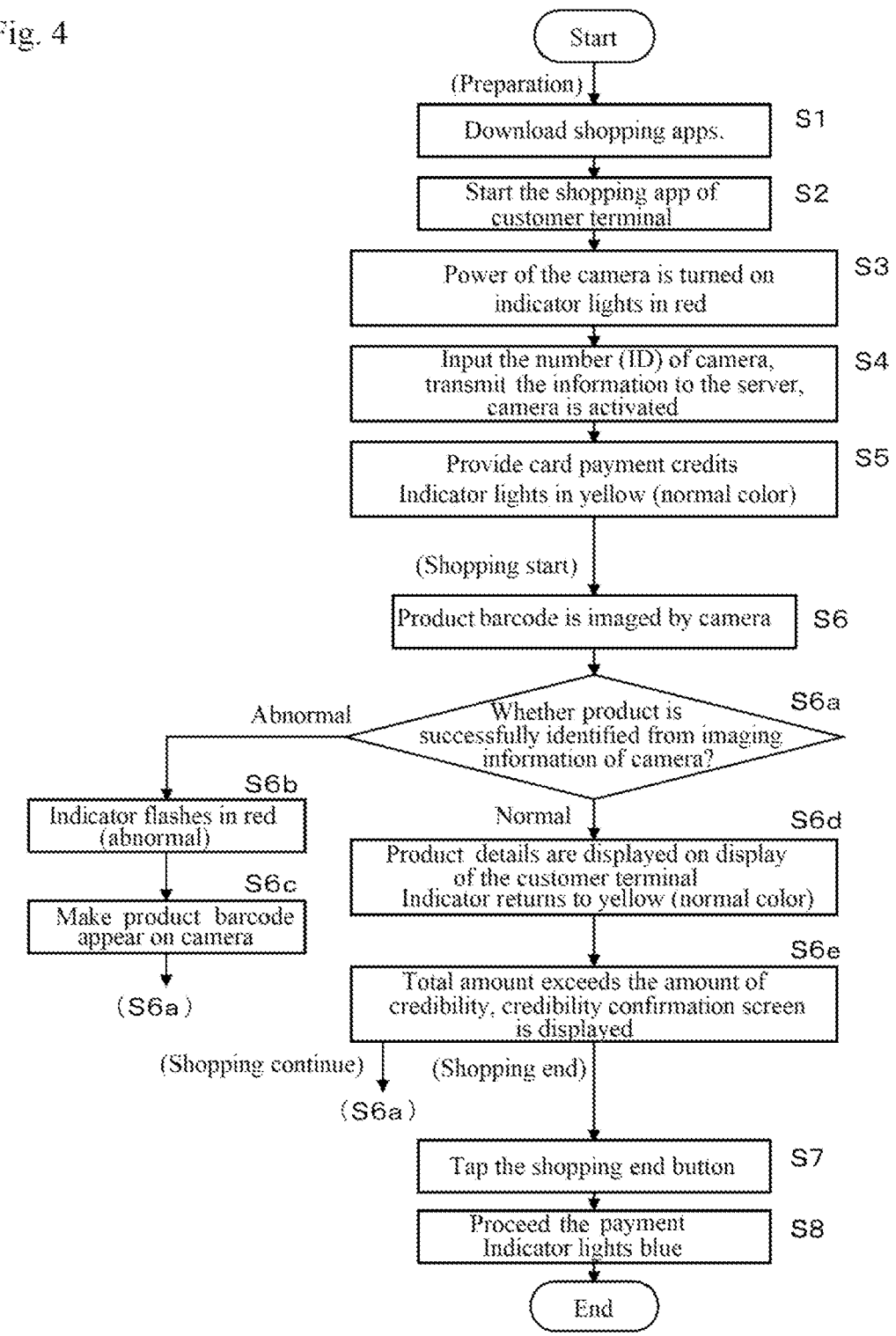
FIG. 4 is a flowchart of processing operation by the system.

FIG. 4 shows a flowchart of a processing operation according to the present system 1. First, steps of preparation will be described.

S1: Access server 3 from customer terminal 7 and download shopping app.

S2: Start the shopping app for the downloaded customer terminal 7 at the cart yard 21 near the entrance of the store 2 where the customer shops. Then, the store 2 can be identified based on a position information of the GPS function of the customer terminal 7.

S3: Power of the camera 6 mounted on the shopping basket 4 is turned on, then the camera 6 automatically receives the radio waves output from the WiFi router 9 equipped in the store 2 and is connected to the WiFi router 9. At this time, the indicator 8 connected to the camera 6 lights in red.

S4: Customer inputs the number (ID) of the camera 6 mounted on the shopping basket 4 to the downloaded shopping app of the customer terminal 7, and transmits the information to the server 3. Then, the WebSite control unit 31 in the server 3 outputs an instruction to activate the specified camera 6. Upon receiving the instruction, the camera 6 is activated in accordance with the instruction.

S5: A brief explanation for shopping is displayed on the display of the customer terminal 7, and also an authorization button for online card payment is displayed on that. The customer will tap the button to provide a credit card payment. For example, ¥30,000 will be credited. If this authorization is approved, the indicator 8 of the camera 6 lights in yellow (this is a normal color)

Next, a shopping start step of starting shopping in a state where the indicator 8 of the camera 6 is yellow.

S6: The customer shall put the shopping product into the shopping basket 4 so as to make the product barcode appear on the camera 6 mounted on the shopping basket 4. Then, the product barcode is imaged by the camera 6.

S6a: The server 3 checks whether the product have been successfully identified from the imaging information of the camera 6. If the server 3 can successfully identify the product, it is a normal time when the product is properly entered in the shopping basket 4.

S6b: If the server 3 cannot correctly identify the product from the imaging information of the camera 6, it is an abnormal time when the product is improperly entered in the shopping basket 4. Then improper indication is displayed blinking on the display of the customer terminal 7, and the indicator 8 of the camera 6 flashes in red (abnormal display). The abnormality is also notified to the store-side management terminal 13 possessed by the store staff. Further, if the product is improperly entered into the shopping basket 4, the recorded image at that time is stored temporarily in the server 3.

S6c: If the product are improperly put into the shopping basket 4 as above and the indicator 8 flashes in red, the customer shall put out of the product from the cart 4 so as to make the product barcode appear on the camera 6, and thereafter the customer shall enter again the product into the shopping cart 4 so as to make the product barcode appear on the camera 6.

S6d: If a proper state can get by the above operation, the product details are displayed on the display of the customer terminal 7. And the indicator 8 returns to yellow (normal color).

S6e: If the total amount of shopping exceeds the amount of credibility, it will also be improperly handled, and the credibility confirmation screen will be displayed again on the customer terminal 7. It can get return to normal state after being approved again by the customer. When shopping continues, it returns to the above S6.

Next, a shopping end step will be described.

S7: At the end of shopping, the customer taps the shopping end button displayed on the display of the customer terminal 7 at the app payment area 24 in the store.

S8: Thus, the total amount of shopping up to that point is displayed on the customer terminal 7 and proceeds to the payment. If the customer approves it, the indicator 8 lights from yellow to blue (end of payment). The store staff confirms the indicator 8 near the app payment area 24. Since the customer has finished making the payment for the shopping, the customer shall pack the product into a bag at the packing rack 26, then shopping is finished, and it is not necessary to pass through the checkout register 23. For this reason, customers are avoided from checkout waiting congestion.

Figure 5:
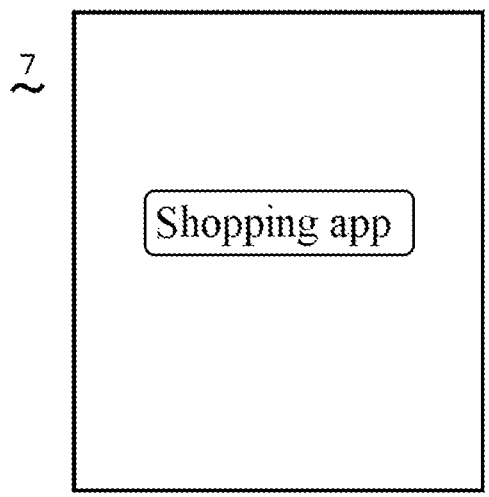
FIG. 5 is a figure which shows a display screen of a customer terminal used for the system.
Figure 6:
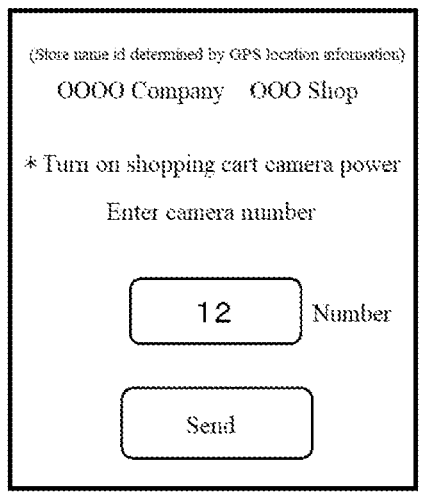
FIG. 6 is a figure which shows the display screen of the customer terminal.
Figure 7:
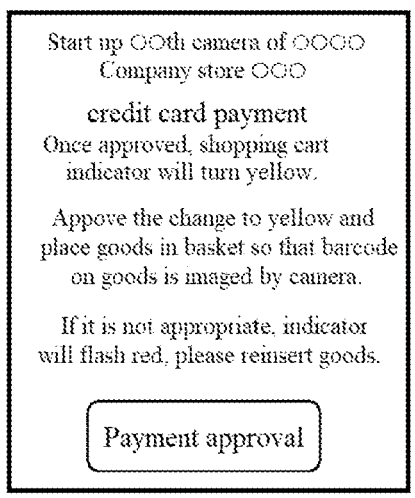
FIG. 7 is a figure which shows the display screen of the customer terminal.
Figure 8:
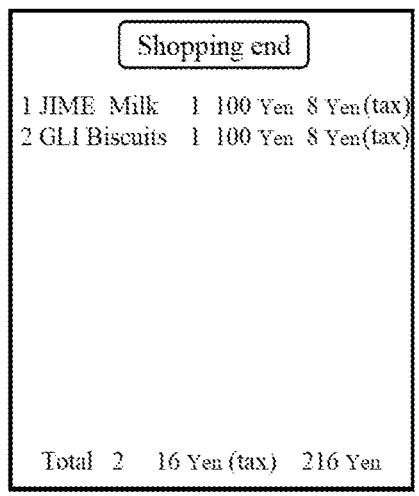
FIG. 8 is a figure which shows the display screen of the customer terminal.
Figure 9:
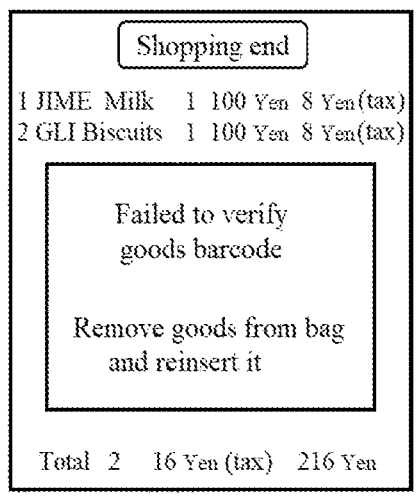
FIG. 9 is a figure which shows the display screen of the customer terminal.
Figure 10:
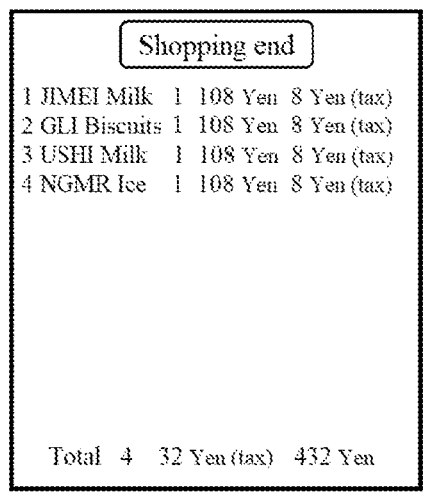
FIG. 10 is a figure which shows the display screen of the customer terminal.

FIGS. 5 to 10 show a display screen of the customer terminal 7 used in the present system 1. FIG. 5 is a screen for starting a shopping app, FIG. 6 is a screen for inputting and sending the number (ID) of the camera 6 at the S4, FIG. 7 is a screen for performing a credit card payment at the S5, FIG. 8 is a screen for showing the product details at the normal time at the S6a, FIG. 9 is a screen for indicating the abnormal time at the S6b, and FIG. 10 is a screen at the time of shopping completion at the S7.

Second Embodiment

Figure 11:
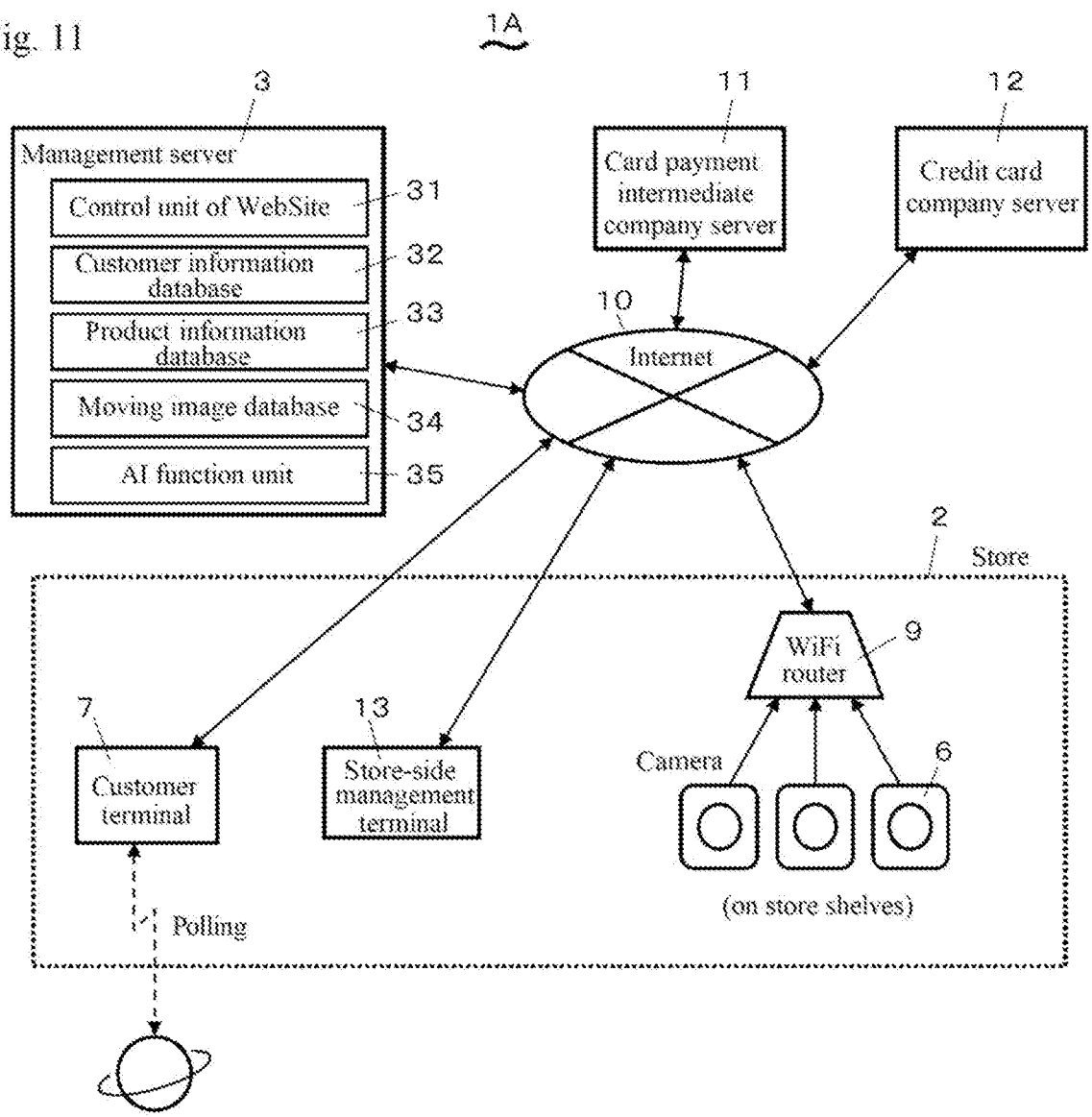
FIG. 11 is a whole block diagram of the shopping payment system by a second embodiment of the present invention.
Figure 12:
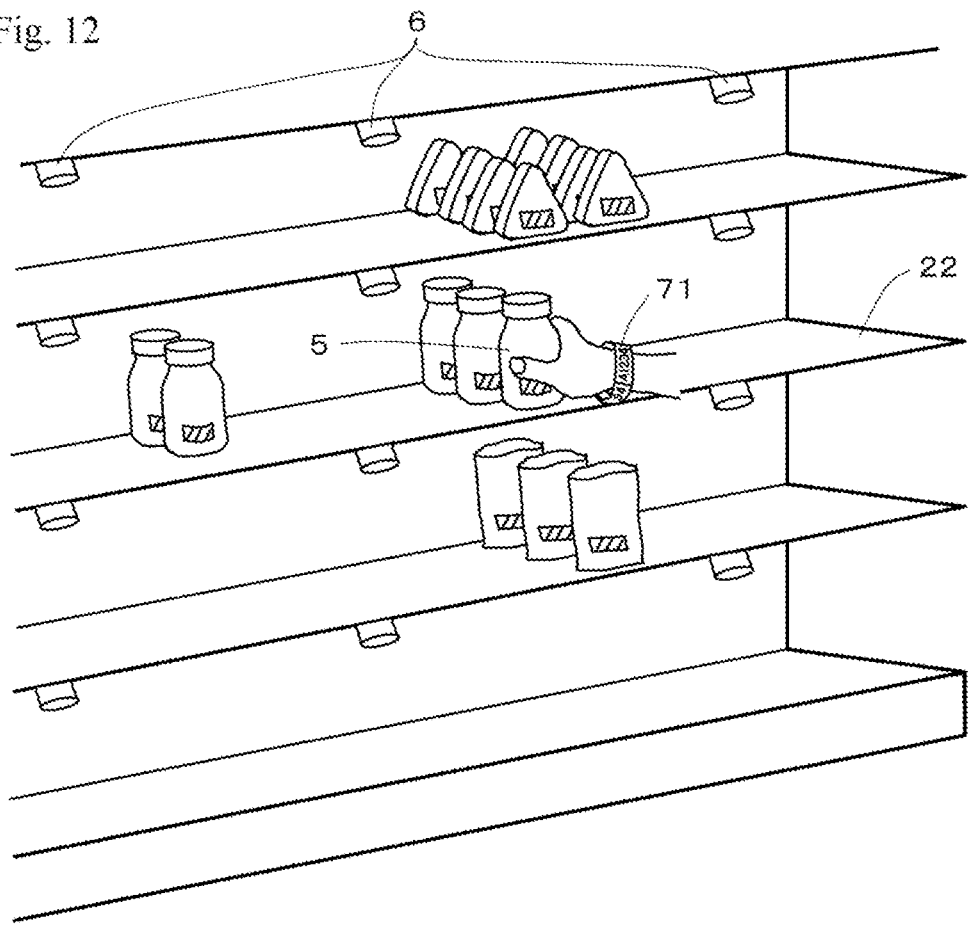
FIG. 12 is a block diagram of a store shelf used for the system.

Next, a shopping payment system according to a second embodiment of the present invention will be described. FIG. 11 shows the entire configuration of the present system 1A according to the embodiment. FIG. 12 shows a configuration of the store shelf 22 for enter on the merchandise (product) 5 used in the present 1A. Whereas the system 1 of the first embodiment described above was mainly for a large store, the system 1A is for a small store and does not use the shopping basket 4 (shopping cart) described above. In the present systems 1A, the camera 6 is mounted on the store shelf 22. Customers who shop will wear a bracelet 71 for customer identification on their wrist. The camera 6 captures the bracelet 71 for customer identification and the product identification barcode when the customer takes the product 5 out of the store shelf 22.

Figure 13:
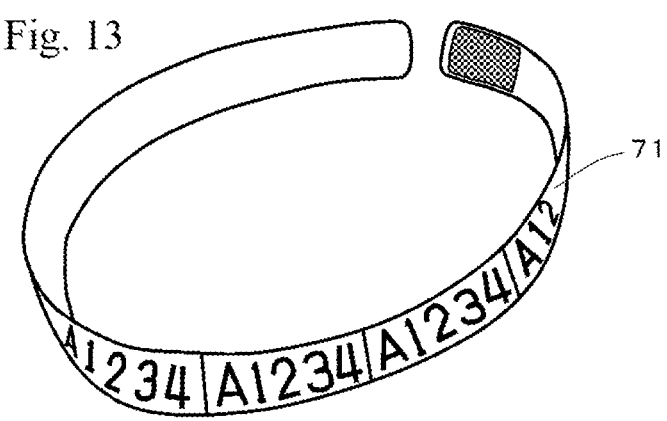
FIG. 13 is a perspective view of a bracelet for customer identification used for the system.
Figure 14:
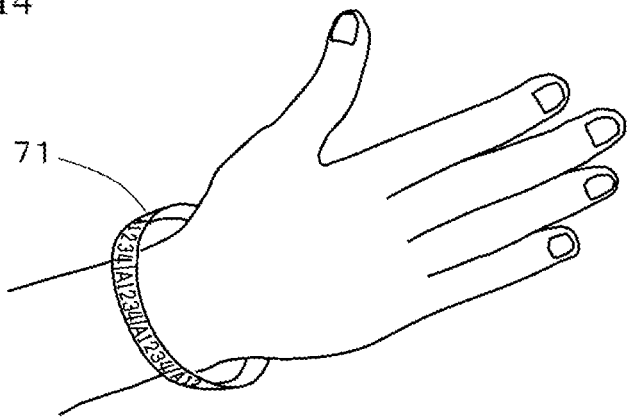
FIG. 14 is a perspective view in the state where a customer installed the bracelet.

A number or the like for customer identification is printed on the bracelet 71 for customer identification, as shown in FIG. 13. As shown in FIG. 14, the customer identification bracelet 71 is attached to the customer's wrist. In the system 1A, a product take-back bag (see FIG. 26, which will be described later) is provided to a customer who wears the bracelet 71 for identifying a customer and shops using a shopping app. Other configurations are similar to those described above. Customers who do not use shopping apps need to settle at the checkout register as usual, after shopping.

Figure 15:
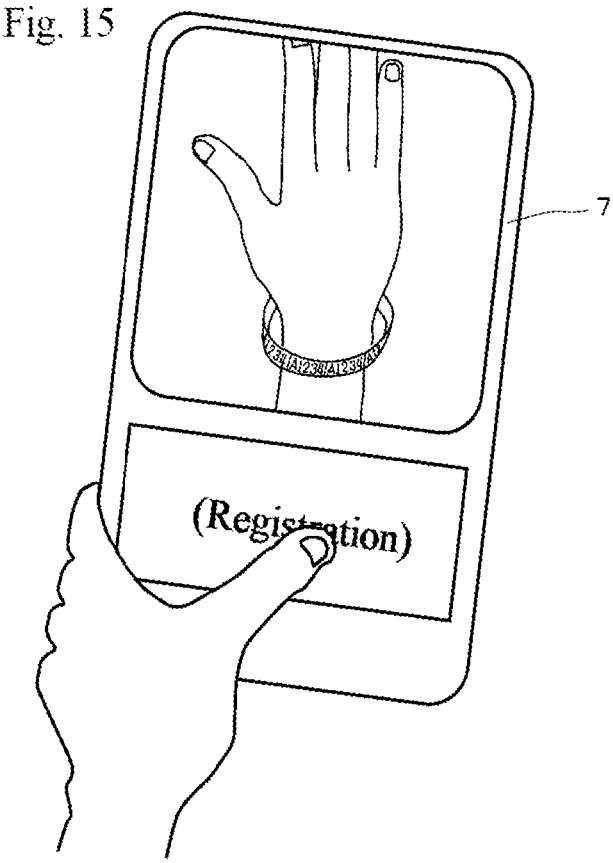
FIG. 15 is a figure which shows the customer terminal used for the system.
Figure 16:
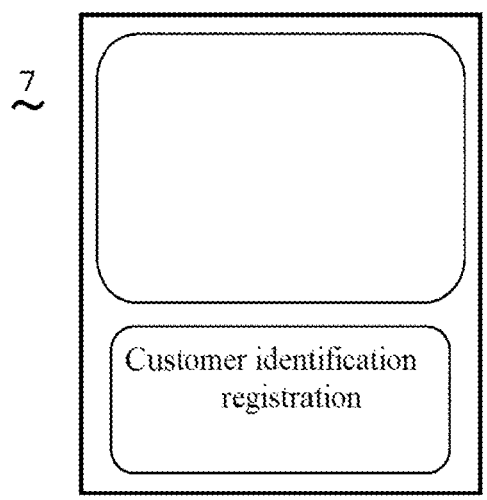
FIG. 16 is a figure which shows the display screen of the customer terminal.

Processing operation by this system 1A will be described below. The customer receives the bracelet 71 for customer identification and the product take-back bag at the store entrance, starts the shopping app with the customer terminal 7 that downloads the shopping app, accesses the server 3 from the customer terminal 7, and the store is identified from the location information of the GPS function of the customer terminal 7. The customer wears the bracelet 71 for identifying the customer on his/her wrist, and as shown in FIG. 15, the wrist with the bracelet 71 for identifying the customer is captured by the customer terminal 7 and transmitted to the server 3, so that the customer identification registration is achieved. After registration is completed, shopping in the store starts.

Figure 17:
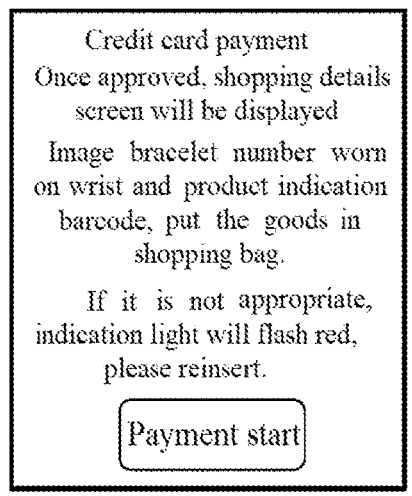
FIG. 17 is a figure which shows the display screen of the customer terminal.

The display screen of the customer terminal 7 using the shopping app according to the present system 1A is shown in FIGS. 16 to 21. First, the customer identification bracelet 71 worn on the wrist of the customer is imaged by the customer terminal 7, and the image is transmitted to the server 3. Thereby, the customer identification registration is made (equivalent to FIGS. 16 and 15). Thereafter, on the screen of the customer terminal 7, an explanation about the shopping is displayed, and the payment credibility of the shopping is performed by tapping the credibility button of the payment (FIG. 17).

Figure 18:
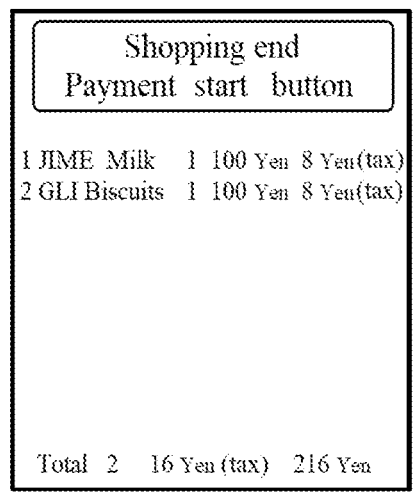
FIG. 18 is a figure which shows the display screen of the customer terminal.

When shopping, the customer takes the product 5 out of the store shelf 22, and enters the product into the product take-back bag, the bracelet 71 for customer identification and the product identification barcode are photographed by the camera 6 installed on the store shelf 22. The camera 6 transmits a captured image of the product enters into and out of the product take-back bag to the server 3. The server 3 identifies product by its AI function. When the products are appropriately identified, a detail of the product in the product take-back bag is displayed on the customer terminal 7 (FIG. 18).

Figure 20:
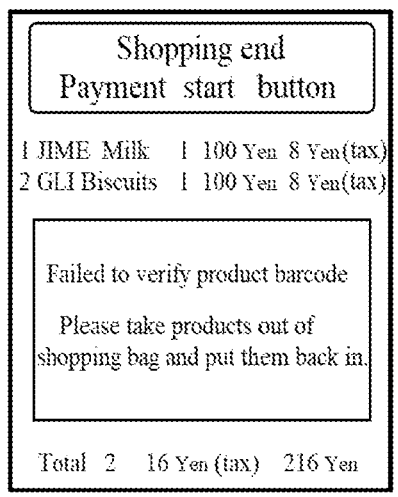
FIG. 20 is a figure which shows the display screen of the customer terminal.

If the identification of the product is not possible and is determined to be improper, the display is blinking red on the display of the customer terminal 7 (FIG. 20). At the same time, it is also notified to the store-side management terminal 13. Further, the recorded image by the camera 6 when it is determined to be improper is temporarily stored in the server 3.

Figure 19:
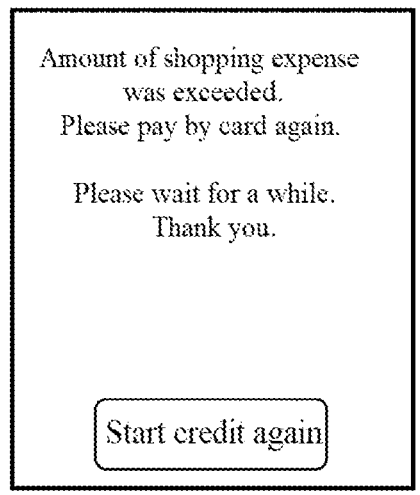
FIG. 19 is a figure which shows the display screen of the customer terminal.

When the display of the customer terminal 7 blinks in red due to the above-described improper operation, the customer shall take an action of returning the product contained in the product take-back bag to the store shelf 22, so that the customer identification bracelet 71 and the product identification barcode are photographed by the camera 6. When this action is properly accomplished, the product is removed from the list and the indication of the customer terminal 7 returns to yellow (normal color). When the total amount of shopping expense at the moment exceeds the above amount of credibility, it is determined to be improper handled and the credibility confirmation screen is displayed again (FIG. 19).

Figure 21:
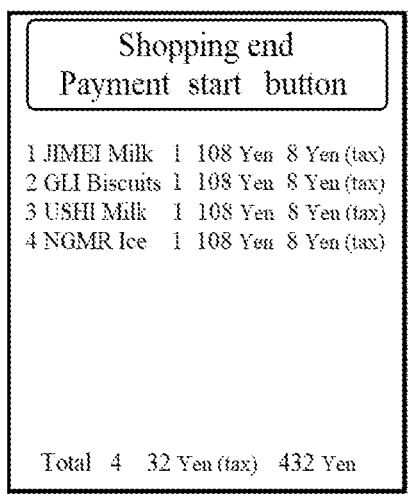
FIG. 21 is a figure which shows the display screen of the customer terminal.

When shopping is finished, the customer taps the shopping end button displayed on the customer terminal 7, and the total amount of shopping is settled (FIG. 21). Incidentally, if the server 3 cannot acquire the GPS information of the customer terminal 7, while the details of the purchased product are displayed on the customer terminal 7, the total amount of shopping is settled.

By completion of the shopping payment, the customer can exit the store without passing through the cash register, then waiting time for passing through the cash register can be eliminated.

Modification of the Second Embodiment

Figure 22:
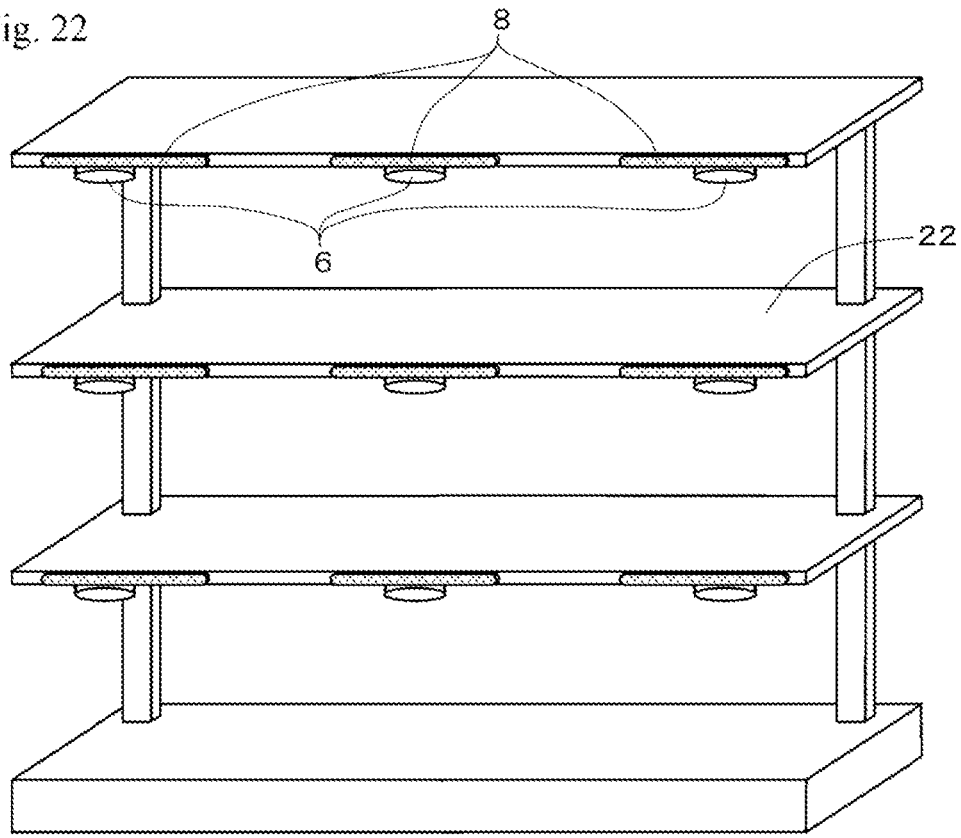
FIG. 22 is a block diagram of the modification of the store shelf used for the system.

FIG. 22 shows a configuration of a commodity shelf 22 according to a modification of a second embodiment of the present system. In this modification, the store shelf 22 is equipped with an indicator 8 for displaying the abnormal time, in addition to the camera 6. Also, customers who do not use shopping apps wears an app non-use identification bracelet (not shown). This app unused identification bracelet has been registered in server 3 by the store-side management terminal in advance, and the same information as the customer terminal 7 of the app user is displayed on the management terminal 13. A customer who use a shopping app wears a bracelet 71 for customer identification as described above.

When the customer who use the app takes the purchased product from the store shelf 22 by a hand wears the identification bracelet, the customer enters the purchased product in the product take-back bag, so that the identification bracelet number and the product identification barcode are captured by the camera 6. Also, the customer who do not use the app enters the purchased product in a shopping basket as the same manner, and go through the checkout register 23. If the number of the identification bracelet and the product identification barcode is not properly captured, the indicator 8 installed in the store shelf 22 having the camera 6 blinks in red. In that case, the customer returns the target product to the store shelf 22 so that the identification bracelet number and the product identification barcode are captured by the camera 6. When the product are returned normally, the red flashing of the indicator 8 disappears. Abnormal operation is temporarily recorded to the server 3.

At the end of shopping, the app user can settle at the customer terminal as described above. The non-user of the app shops by using the app non-use identification bracelet pre-registered to the store-side management terminal, thereby the description of the product taken out of the store shelf 22 is displayed in real time on the store-side management terminal. Thus, the store staff checks the contents of the purchase at the checkout register 23, and shopping is completed with cash payment or credit card payment.

Thus, the app non-user also shops wearing the identification bracelet, the details of the product taken out from the store shelf 22 is displayed on the store-side management terminal in real time, and an abnormal is displayed by the indicator 8 installed in the store shelf 22. In this way, the damage caused by shoplifting can be minimized. Further, it may be arranged a camera for recording the store shelf 22 in a wide field of view.

Configuration for Reporting Abnormalities in Various Embodiments

Figure 23:
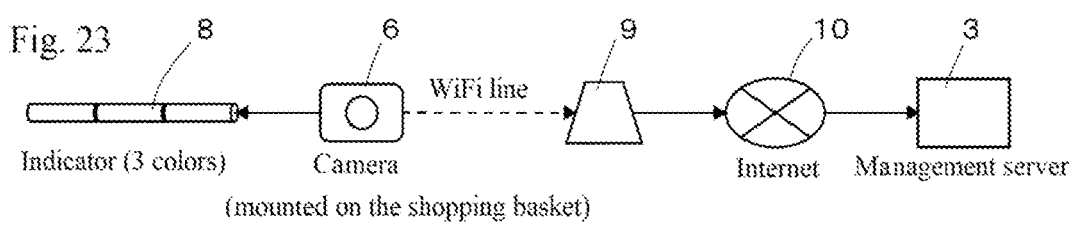
FIG. 23 is a block diagram for abnormality notification in the system of the first embodiment.

FIG. 23 shows a configuration for reporting abnormalities for mainly a large store in the system according to the first embodiment. The camera 6 mounted on the shopping basket has a built-in WiFi line function and is programmed with an access function to confirm instructions from the server 3 via the WiFi router 9. The camera 6 receives an instruction from the server 3, and in the event of an abnormality, it changes the light color of the indicator 8 provided in the shopping basket and flashes or lights. The indicator 8 and the camera 6 are connected by a wire.

Figure 24:
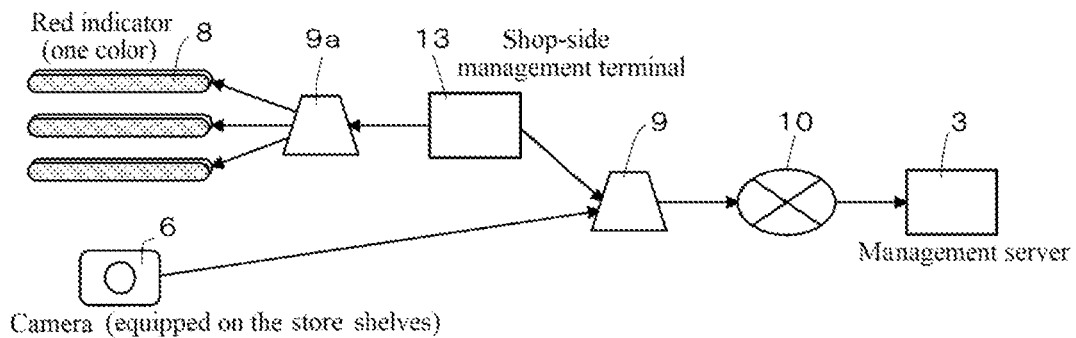
FIG. 24 is a block diagram for abnormality notification in the system by the modification of second embodiment.

FIG. 24 is a system according to a modification of the second embodiment (FIG. 22), showing a configuration for reporting abnormality for mainly a small store. The camera 6 installed on the store shelf is connected with the WiFi router 9 by a wire, and it shall be simple to transmit only the imaging image to the server 3, and the access function for confirming the instructions from the server 3 is not programmed. The system includes a store-side management terminal 13 which is connected to the server 3 via the router 9 and Internet 10. The management terminal 13 is connected to the indicator 8 equipped on in the store shelf 22 via the router 9a by a wire and lights the indicator 8 at abnormality based on an instruction of the server 3. In this system, a configuration for anomaly notification can be obtained at a relatively low cost.

Third Embodiment

Figure 25:
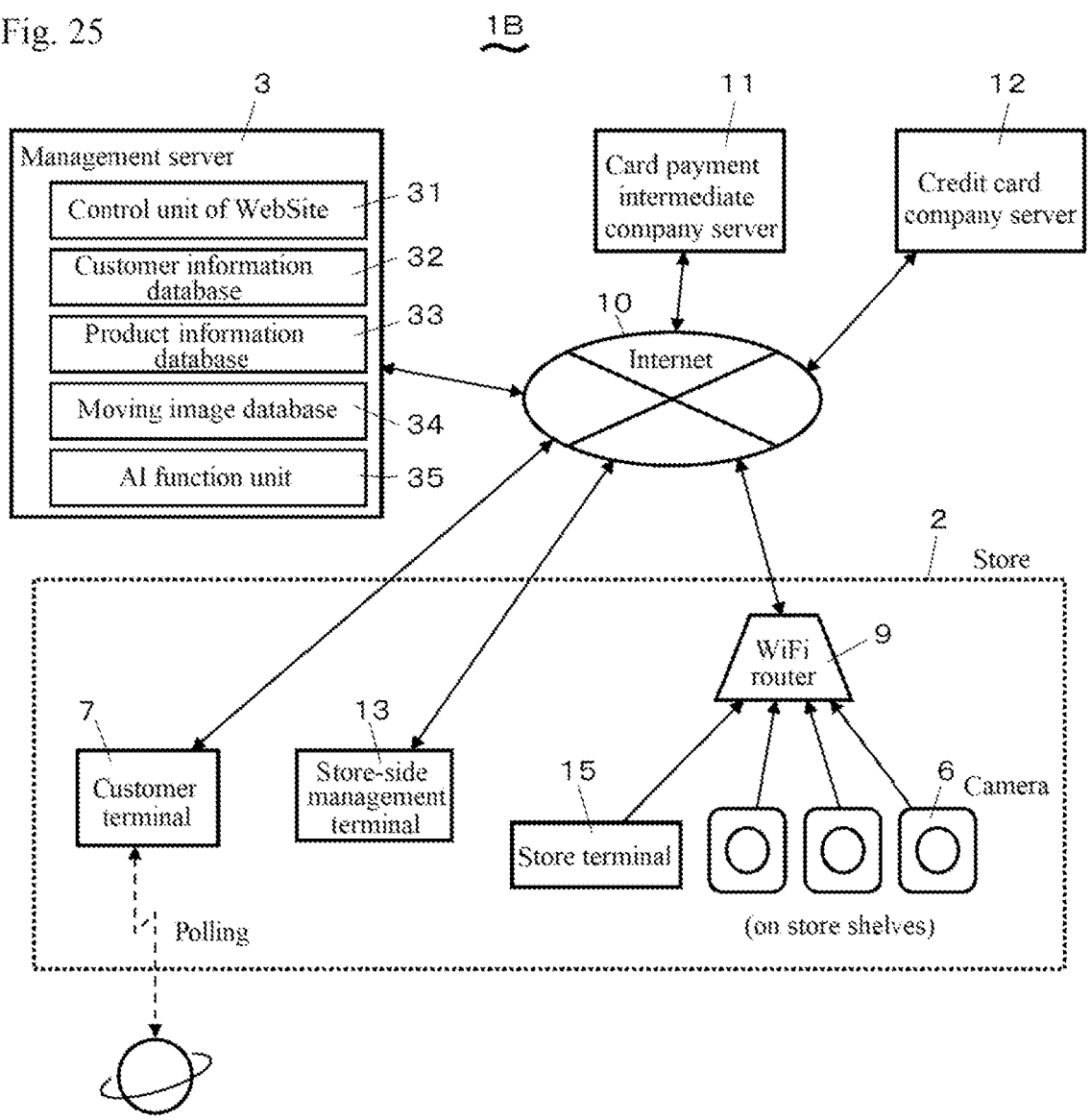
FIG. 25 is a figure which shows the structure of the system by a third embodiment of the invention.

FIG. 25 shows a configuration of a shopping payment system according to a third embodiment. System 1B is for a small store and is a further modification of the second embodiment shown in FIGS. 11 and 12, and does not use the customer identification bracelet 71 and the app non-use identification bracelet used in the second embodiment. Instead, as the customer identification information of the shopping app user, the app number or customer information (hereinafter, referred to as the ID) of the customer terminal 7 that started a shopping app is acquired on the store side. Shoppers who do not use shopping apps shop using a store terminal 15 provided by the store side.

In the system 1B, the camera 6 has a line function of short-distance wireless communication, and automatically acquires the customer ID of the customer terminal 7 or the identification information such as the app number, when the customer terminal 7 that started the shopping app approaches the camera 6. The short-distance wireless communication may use techniques such as BLE (Bluetooth Low Energy) (registered trademark) standards, or NFC (Near Field Communication) standards. The cameras 6 are connected to the router 9 provided in the store. When shopping is appropriately performed using the customer terminal 7 or the store terminal 15, the ID of the customer terminal 7 or the store terminal 15 acquired by the camera 6 and the product identification barcode photographed are sent to the management server 3. Then, the detailed information of the shopping is sent from the management server 3 to the customer terminal 7 or the store terminal 15, and the store-side management terminal 13, thereby the detailed information of the shopping is displayed.

Figure 26:
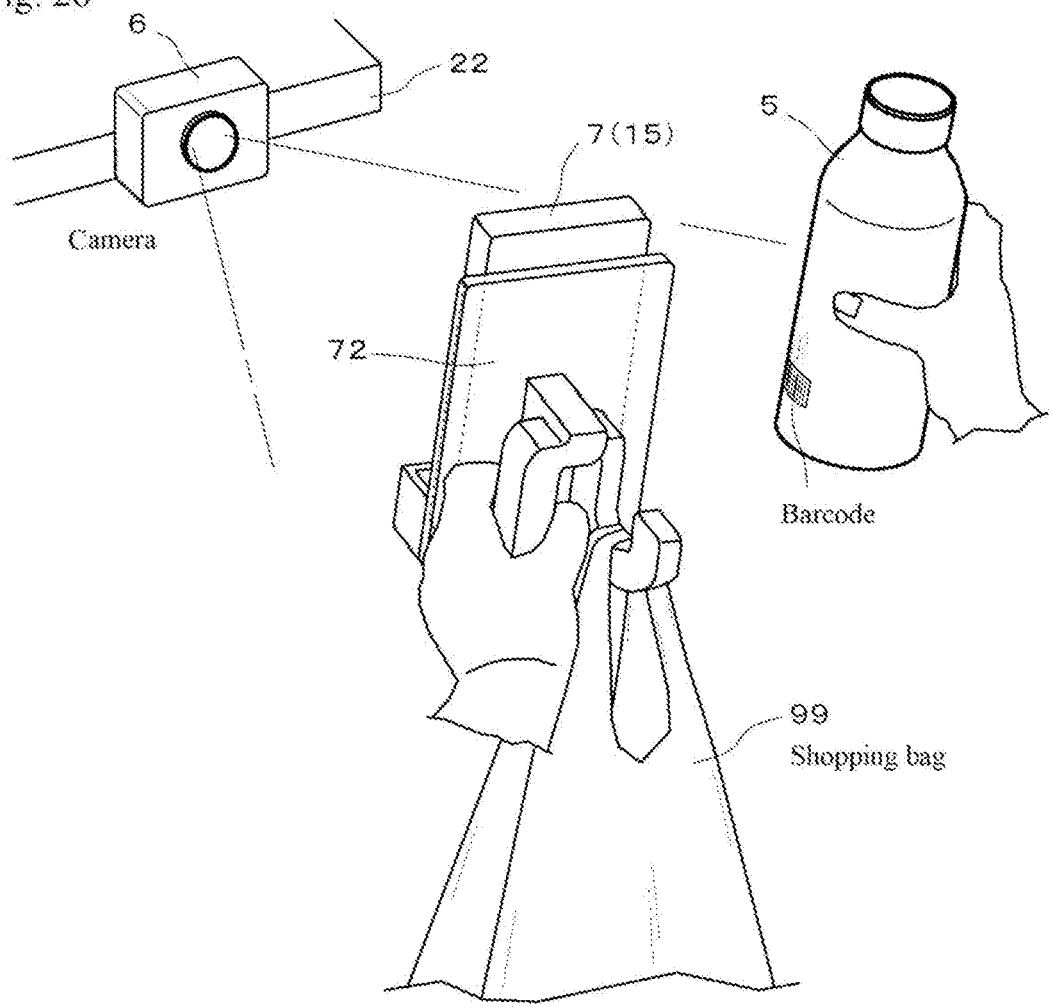
FIG. 26 is a figure which shows the condition at the time of shopping by the system.

FIG. 26 shows the situation of shopping in the present system. A customer terminal 7 or the store terminal 15 and a shopping bag 99 are held by a holder 72, and a shopper holds a holder 72 with one hand and takes the product 5 with the other hand. The shopping bag 99 is a take-back bag of which shoppers receive at the store entrance. The shopper takes out the product 5 from the store shelf 22 in the shopping bag 99 while bringing the customer terminal 7 or the store terminal 15 closer to about 30 cm to the camera 6 equipped on the store shelf 22, and so that the product identification barcode attached to the product 5 can be photographed with the camera 6. The camera 6 transmits the image of product 5 to be taken in and out to the server 3, the server 3 identifies the product 5 by AI function from the video received, and displays the details to the customer terminal 7 or store terminal 15. When the shopper stops buying the product enter in the shopping bag 99, he shall make sure the product out of the shopping bag 99 is taken out by the camera 6, thereby the item is deleted.

Thereafter, when the card payment is completed at the app payment area 24, the purchase of product is possible without passing through the register, thereby eliminating wasted time due to waiting for checkouts such as busy hours. Also, shoppers who do not use the app shops using the store terminal 15, so that he can make payments without reading the purchased product at the checkout register.

Figure 27:
FIG. 27 is a figure which shows the display screen of the customer terminal used for the system.

FIG. 27 shows a display screen of the customer terminal 7 used in the present system 1B. The display screen of the customer terminal 7 is similar to the aforementioned FIGS. 16 to 21, and only the authorization screen immediately after the start-up of the app shown in FIG. 17 is different, which is shown in FIG. 27. In the authorization screen, the precautions for shopping using this app are displayed.

As described above, the product details are entered to the customer terminal 7 or the store terminal 15 by simply capture an image with the camera 6 of an operation of taking the product out of the store shelf 22 while the customer terminal 7 or the store terminal 15 is brought close to the camera 6. And, since the operation can be close to the conventional shopping operation in the store, the system can be easily accepted by the customer as well.

Incidentally, while the description of the purchased product is stored in the customer terminal 7, when the customer terminal 7 is away from a certain area, the server 3 appropriately checks the GPS information of the customer terminal 7, then the server 3 determines that it is not appropriate, and the amount of the details up to that point is settled.

Further, when confirming by holding the product for judgment whether to purchase the product, or if shoplifting is illegally performed, it is conceivable to take the product from the store shelf 22 without photographing the barcode of the product on the camera 6. As a countermeasure, it is desirable to provide a separate camera for monitoring the entire store shelf corner. The photographed image by the camera is sent to the server 3, and the abnormality is determined by the AI function of the server 3, in the case of abnormality, the indicator 8 is flashed or the lighting color is changed to an abnormal time so as informed, and also the abnormality is displayed on the store-side management terminal 13.

The present invention is not limited to the configuration of the above embodiment, it is possible to various modifications. For example, the configuration for abnormal notification is not limited to the above, it can be arbitrarily set.

EXPLANATION OF SYMBOLS

1, 1A, 1B shopping payment systems
2 store
22 store shelf
3 management server
4 shopping basket
4a shopping carts
5 product
6 camera
7 customer terminal
71 customer identification braces 8 indicator
9 WiFi router
10 Internet
13 store-side management terminal
15 shop terminal

The invention claimed is:

1. A shopping payment system for product purchased at stores, comprising;
    a management server that processes shopping payment for merchandise based on a shopping application that assists customers in the store to settle their merchandise purchases;
    a camera capable of communicating with the management server and capable of imaging products that are entered in and out of a shopping basket by customers; and
    a customer terminal of a customer who downloaded the shopping application which can access the management server, wherein,
    the management server links the customer terminal with the camera, by access from the customer terminal that started the shopping application,
    the camera receives an instruction to start imaging by accessing the management server, and transmits imaging information of a product to be entered in and out of the shopping basket to the management server,
    the management server identifies the product type based on the imaging information transmitted from the camera and a product database stored in advance, if it can be identified normally, notifies shopping product details to the customer terminal as a normal state, and if it cannot be identified normally, notifies an abnormal state to the customer terminal,
    if the customer approves the shopping product details displayed on the customer terminal, the customer terminal notifies the approval to the management server so that a payment is completed,
    the camera is attached to the shopping basket,
    the shopping basket has an indicator that lights in a plurality of lighting states depending on whether it is in a normal state or an abnormal state,
    the customer terminal receives an ID preset in the camera and transmits the ID to the management server so that the link of the customer terminal with the camera is made,
    the management server makes activate a corresponding camera when the link is made, and lights on the shopping basket indicator in a normal state,
    the management server lights on the shopping basket indicator in an abnormal state,
    if the customer approves a shopping product detail displayed on the customer terminal, the customer terminal notifies the approval to the management server, and
    upon receiving the approval, the management server lights on the shopping basket indicator to indicate the status of a payment completion.

2. A shopping payment system for product purchased at stores, comprising;
    a management server that processes shopping payment for merchandise based on a shopping application that assists customers in the store to settle their merchandise purchases;
    a camera capable of communicating with the management server and capable of imaging products that are entered in and out of a shopping basket by customers;
    a customer terminal of a customer who downloaded the shopping application which can access the management server;
    a customer identification bracelet worn by customers who shop; and
    a product take-out bag that is handed over to the customer wearing the customer identification bracelet instead of the shopping basket, wherein,
    the management server links the customer terminal with the camera, by access from the customer terminal that started the shopping application,
    the camera receives an instruction to start imaging by accessing the management server, and transmits imaging information of product to be enter in and out of the shopping basket to the management server,
    the management server identifies the product type based on the imaging information transmitted from the camera and a product database stored in advance, if it can be identified normally, notifies shopping product details to the customer terminal as a normal state, and if it cannot be identified normally, notifies an abnormal state to the customer terminal,
    if the customer approves the shopping product details displayed on the customer terminal, the customer terminal notifies the approval to the management server so that a payment is completed,
    the camera is provided in a product shelf on which products are placed, and
    the camera images the customer identification bracelet and the product identification barcode when a customer takes out the product from the product shelf.

* * * * *